Dec. 24, 1929. R. W. BURNETT 1,740,765
PIPE ANCHOR
Filed July 10, 1922
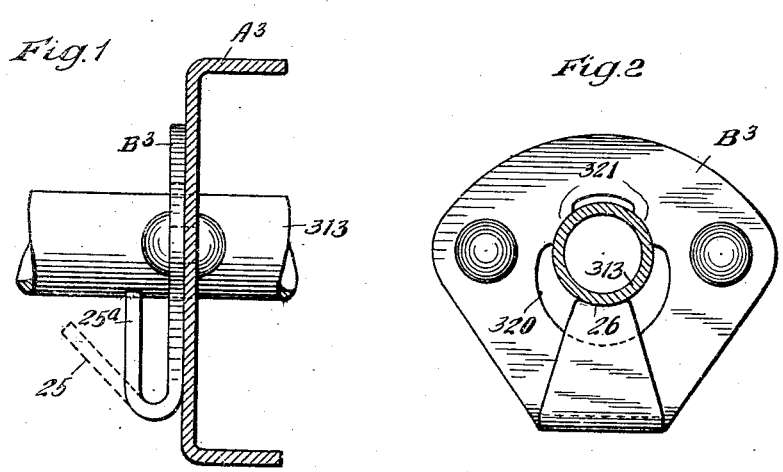
Inventor
Richard W. Burnett
By Geo. I. Haight
His Atty.

Patented Dec. 24, 1929

1,740,765

UNITED STATES PATENT OFFICE

RICHARD W. BURNETT, OF CHICAGO, ILLINOIS

PIPE ANCHOR

Application filed July 10, 1922. Serial No. 573,908.

This invention relates to improvements in pipe anchors.

One object of the invention is to provide means for anchoring pipes which will be efficient in operation and which may be made and applied at very small expense, the pipe anchor being especially adapted for train pipes.

Another object of the invention is to provide efficient and economical means for holding the usual angle cock of an air hose used on trains.

More specifically, an object of my invention is to provide means for holding angle cocks or anchoring pipes which may be made at very small expense in the form of steel pressed plates or forgings.

Referring to the drawings, a support $A^3$ is shown in the form of a needle beam, the same being suitably apertured to accommodate a pipe 313 therethrough. The pipe anchor in this instance consists of a single plate $B^3$ having an opening 320 therethrough with bearings 321 for the pipe, as shown in Figure 2. Said plate $B^3$ is adapted to be riveted directly against the support or needle beam and at its bottom is provided with an integral flange initially bent outwardly and upwardly as indicated at 25 by dotted lines in Figure 1. When used to anchor the pipe, said flange 25, which has a rounded upper end 26, is hammered to a vertical position as indicated at $25^a$, so as to wedge it against the pipe and thereby securely anchor the pipe between the three points of support on the bearing surface 26 and bearings 321—321. The arrangement shown in the drawings affords a very cheap pipe anchor both with regard to initial cost and cost of application.

I have herein shown and described what I now consider the preferred manner of carrying out my invention, but all changes and modifications are contemplated that come within the scope of the claims appended hereto.

I claim:

1. In a pipe anchor adapted to be secured to a fixed support on a railway car, said anchor comprising a plate of inherently resilient sheet metal, having a flat main body portion provided with means for securing the same to the support, said main body portion having an opening therethrough to loosely accommodate the pipe, said plate having at one side of said opening, an integral portion bent back upon itself and extending towards the opposite side of said opening in diverging relation to the main portion of said plate and adapted to be displaced toward said main portion of the plate to bring the end thereof into wedging engagement with one side of the pipe to clamp the pipe against the wall of said opposite side of said opening.

2. In a pipe anchor, the combination with a support, said anchor comprising a plate-like member provided with continuous walls defining an aperture therethrough adapted for the accommodation of a pipe extended through said aperture, said plate having a bendable portion attached at one of its ends to said plate at one side of said aperture and having its free end in one position projecting in the direction of said aperture, the free end of said bendable portion normally being disposed clear of said aperture and adapted to be bent into contact with a pipe in said aperture to wedge the pipe against the walls defining said aperture, and securing means cooperating with said support and anchor for rigidly securing the anchor to said support at a point remote from and independent of said bendable portion and the walls defining the aperture through which the pipe extends.

In witness that I claim the foregoing I have hereunto subscribed my name this 24th day of June, 1922.

RICHARD W. BURNETT.